United States Patent [19]

Katahira

[11] Patent Number: 5,373,751
[45] Date of Patent: Dec. 20, 1994

[54] LOCATING TABLE APPARATUS

[75] Inventor: Masayuki Katahira, Gunma, Japan

[73] Assignee: NSK Ltd., Tokyo, Japan

[21] Appl. No.: 39,727

[22] Filed: Mar. 30, 1993

[30] Foreign Application Priority Data

Mar. 31, 1992 [JP] Japan .................... 4-077676

[51] Int. Cl.$^5$ .................. F16H 25/20; G10K 11/04
[52] U.S. Cl. .................. 74/89.15; 74/606 R; 108/143; 181/200
[58] Field of Search ........... 74/89.15, 424.8 R, 606 R, 74/479 PH; 181/149, 199, 200, 201, 202, 203, 204, 205; 108/143

[56] References Cited

U.S. PATENT DOCUMENTS

| | | | |
|---|---|---|---|
| 2,237,958 | 4/1941 | Hansen et al. | 74/606 R |
| 4,730,746 | 3/1988 | Yankoff | 74/606 R X |
| 5,062,357 | 11/1991 | Senior et al. | 181/200 X |

*Primary Examiner*—Allan D. Herrmann
*Attorney, Agent, or Firm*—Sughrue, Mion, Zinn, Macpeak & Seas

[57] ABSTRACT

A locating table apparatus is provided with a housing, a base member fixed in the housing, a table mounted so as to freely move in a longitudinal direction, driving members located on the base member for supporting and driving the table, an outer cover covering the table, an inner cover formed with a U-shaped groove member for covering the driving members therein, and a sound absorbing member attached to at least one of the inner and outer cover, whereby the noisy sound generated inside the locating table apparatus is attenuated by and absorbed in the sound absorbing member.

19 Claims, 3 Drawing Sheets

LOCATING TABLE APPARATUS

BACKGROUND OF THE INVENTION

The present invention relates generally to a locating table apparatus. More particularly, the present invention relates to the locating table apparatus preferably employed for a robot operable in a cartesian coordinate system and a precise locating apparatus for production of semiconductors or the like.

In general, a conventional locating table apparatus is constructed such that a table is supported to freely move in one direction with the linear movement guiding members arranged on a base stand so that the table is moved in the direction along a screw shaft by rotating the screw shaft. In addition, another conventional locating table apparatus is also known of the type providing a housing of which side and upper surfaces are covered with dustproof covers.

For example, as shown in FIG. 7 which is a cross-sectional view showing a conventional locating table apparatus designated by reference numeral 200. The locating table apparatus 200 provides a ball screw unit 20. A screw shaft 20a of the ball screw unit 20 is rotatably supported with support members fixedly mounted on a base stand 31 at both ends of the screw shaft 20a. The screw shaft 20a is operatively linked to a motor (not shown) so as to be rotationally driven. A ball screw nut 20b threadably fitted onto the screw shaft 20a is fixedly provided on a bracket 24 secured onto a lower surface of a table 25. Bearings 27b of a linear guide unit 27 are fixedly disposed on both ends of the lower surface of the table 25 via spacer 26, and each of the bearings 27b is constructed so as to move in a axial direction along linear movement guiding rails 27a.

The table 25 of the locating table apparatus 200 is sealed with a dustproof cover 30 forming two slits 29 extending in the axial direction on an upper surface thereof. Projections 25a formed on both the sides of the table 25 are upwardly projected, and a moved member (e.g., an operating table) is mounted on the projections 25a through the slits 29 of the dustproof cover 30.

With the location table apparatus 200 constructed in the above-described manner, when the motor is driven to rotate the screw shaft 20a, the ball screw nut 20b is moved along the screw shaft 20a corresponding to rotational directions thereof, so that the table 25 is moved in the axial direction. Although the table of the conventional locating table apparatus is sealed with the dustproof cover, a soundproof function is not taken into account. Therefore, there is a problem that noisy sound is generated inside the locating table apparatus during an operation thereof.

SUMMARY OF THE INVENTION

With the above problem accompanying the conventional locating table apparatus, an object of the present invention is to provide a locating table apparatus including soundproof members which assures that a sufficient soundproof effect can be achieved.

To accomplish the above object, the present invention provides the locating table apparatus including a table mounted to freely move in the axial direction along a screw shaft, and supported by linear movement guiding members mounted on the base stand, wherein the locating table apparatus is characterized in that the table is covered with an outer cover having slits extending in the direction along the screw shaft, the screw shaft is covered with an inner cover having a U-shaped sectional contour, and a sound absorbing member is attached to at least one of the inner and outer cover, whereby the noisy sound generated inside the locating table apparatus is twice attenuated by and absorbed in the sound absorbing member.

The noisy sound generated in the vicinity of a ball screw nut during an operation of a driving motor is attenuated by the sound absorbing member arranged on an inner surface of an inner cover or an outer cover. Further, the noisy sound is attenuated in the space defined between opposite surfaces interposing a ball screw nut, so that the noisy sound disappears in the locating table apparatus. Moreover, in case that the sound absorbing members are arranged at positions located opposite to each other in the axial direction along the ball screw nut, a sound attenuating effect can be improved much more.

BRIEF DESCRIPTION OF THE DRAWINGS

In the accompanying drawings.

DETAILED DESCRIPTION OF THE PREFERRED EMBODIMENTS

The present invention will now be described in detail hereinafter with reference to the accompanying drawings which illustrate preferred embodiments thereof.

Figure 1:
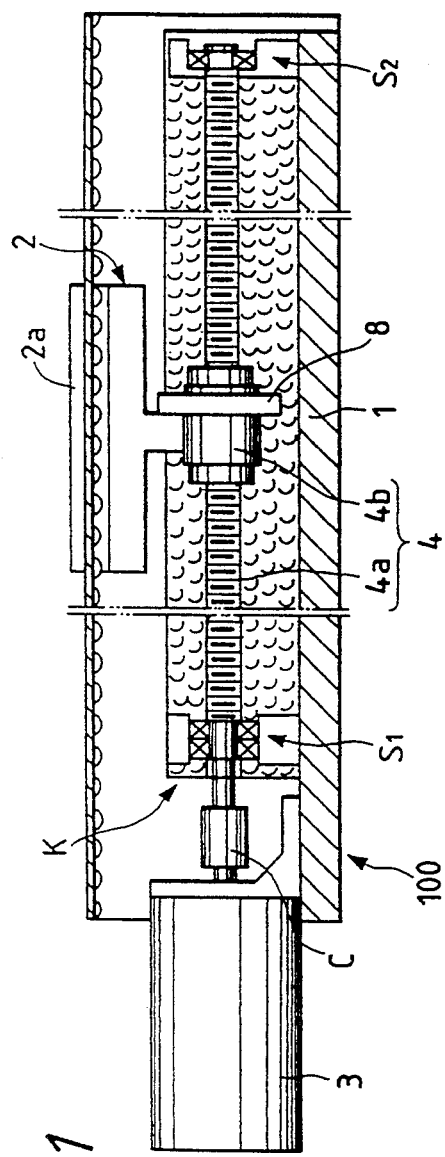
FIG. 1 is a vertical sectional view of a locating table apparatus constructed according to a first embodiment of the present invention.
Figure 2:
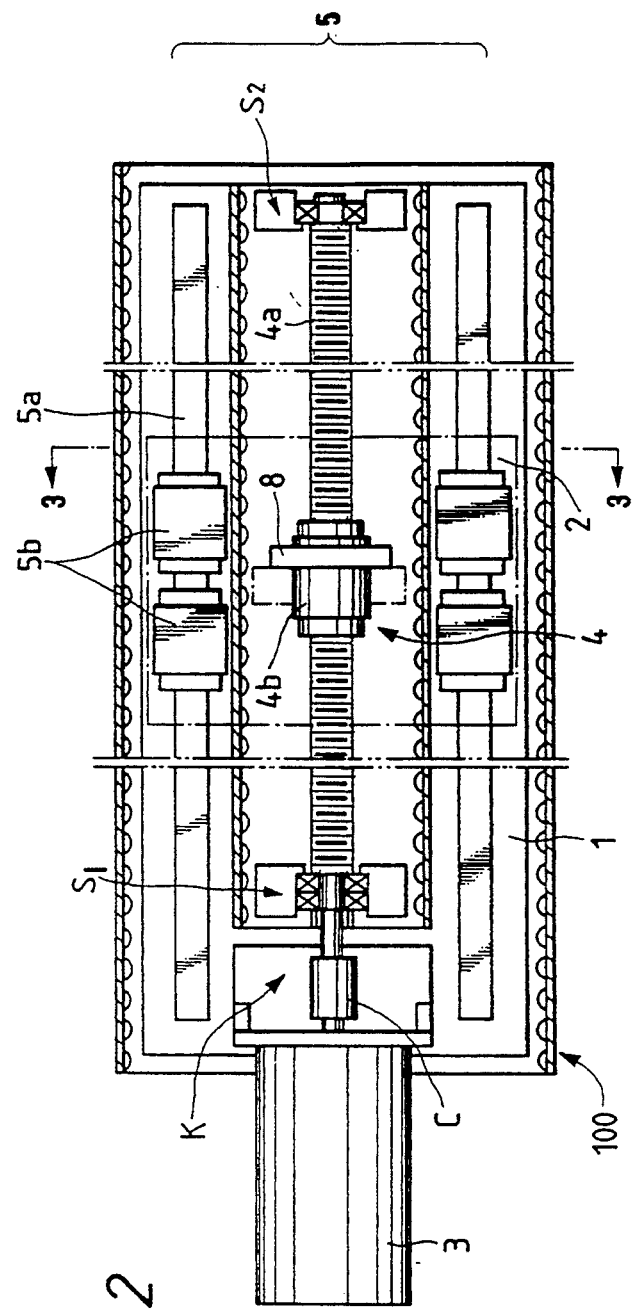
FIG. 2 is an exploded plan view of the locating table apparatus constructed according to the first embodiment of the present invention.
Figure 3:
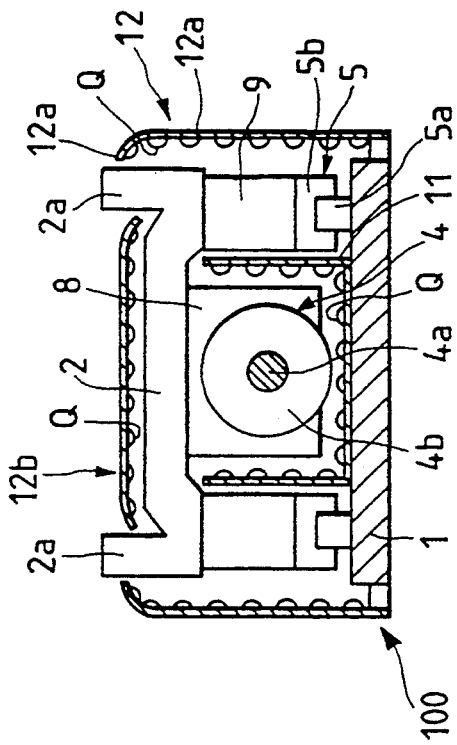
FIG. 3 is a cross-sectional view of the locating table apparatus taken along line 3—3 as shown in FIG. 2.

FIGS. 1 to 3 show a locating table apparatus constructed according to a first embodiment of the present invention.

In these drawings, reference numerals 1 designates a base stand for a locating table apparatus 100. A driving system K is mounted on the base stand 1 and a table 2 is placed on the driving system K. The table 2 is mounted on linear guide bearing 5b fitted onto guide rails 5a extending in parallel with each other in a longitudinal direction of the base stand 1 via spacers 9.

A bracket 8 is secured on a lower surface of the table 2. A ball screw nut 4b is fitted through the bracket 8, and a flange of the ball screw nut 4b is fixedly secured to the bracket 8 by tightening bolts (not shown). A linear guiding unit 5 is constructed with the guide rails 5a and the linear guide bearings 5b fitted onto the guide rails 5a. With this construction, the table can slidably be moved in an axial direction along the linear guiding unit 5.

Projections 2a are arranged on both sides of an upper surface of the table 2 so as to upwardly project, and another member (e.g., an operating table) is mounted on the projections 2a during a practical use of the locating table apparatus 100.

The driving system k is provided with a motor 3 and a ball screw unit 4 operatively linked to the motor 3 via a coupling C, and the ball screw nut 4b is threadably engaged with a screw shaft 4a of the ball screw unit 4 via a number of balls (not shown).

Both ends of the screw shaft 4a are rotatably supported with support brackets $S_1$ and $S_2$ fixedly mounted on the base stand 1 via roller bearings (not shown). When the screw shaft 4a is rotationally driven by the motor 3, causing the screw shaft 4a to be rotated, the ball screw nut 4b is moved in the axial direction corresponding to rotational directions of the screw shaft 4a, so that the table 2 can axially be moved in the forward and rearward directions.

As shown in FIG. 3, reference numeral 11 designates an inside soundproof cover (hereinafter referred to simply as an inner cover). The inner cover 11 is formed with a U-shaped groove member in such a manner that the screw shaft 4a is located at the central position of the inner cover 11 and a whole of the screw shaft 4a is surrounded with the inner cover 11. A sound absorbing member Q having a corrugated unevenness made of a spongy material is attached to the whole inner surface of the inner cover 11, thereby to attenuate and intercept the noisy sound generated by the screw shaft 4a.

Reference numeral 12 designates an outer cover providing slits 13 extending in the axial direction of the screw shaft. The outer cover 12 is composed of side soundproof covers 12a (hereinafter referred to simply as a side cover) and an upper soundproof cover 12b (hereinafter referred to simply as an upper cover). The side covers 12a are uprightly disposed on the base stand 1 so as to serve as side surfaces of the locating table apparatus 100. The corrugated sound absorbing member Q is attached to the inner surface of each side cover 12a in the same manner as the inner cover 11.

The upper cover 12b is provided over the table 2 in such a manner as to cover a concave portion formed on the upper surface table 2 therewith. The upper cover 12b is formed so as to unitedly engage the side cover 12a thereto. As is best shown in FIG. 3, the projections 2a of the table 2 are upwardly projected above the upper cover 12b. The corrugated sound absorbing member Q is attached to the inner surface of the upper cover 12b in the same manner as the inner cover 11 and the side covers 12a.

Opening upper ends of the side covers 12a are not flushed with opening side ends of the upper cover 12b. Specifically, as shown in FIG. 3, both the opening side ends of the upper cover 12b are downwardly inclined, and the opening upper ends of the side cover 12a are inwardly bent such that a height of each opening side end of the upper cover 12b is inclined so as to be lower than that of each opening upper end of the side cover 12a (i.e., the concave portion of the upper surface of the table 2 is downwardly inclined at both the ends thereof corresponding to the downward inclination of the upper cover 12b). This arrangement is intended to easily attenuate the noisy sound generated in the locating table apparatus 100 in combination with the side covers 12a and the upper cover 12b.

In this embodiment, when the motor 3 is rotationally driven, a rotational power of the motor 3 is transmitted to the screw shaft 4a via the coupling C, so that the screw shaft 4a is rotated, causing the table 2 to be moved in the axial direction. In the case that the tables 2 is moved in the axial direction at a high speed, noisy sound is generated from the ball screw nut 4b threadably engaged with the screw shaft 4a. However, the noisy sound generated from the ball screw nut 4b is intercepted by the inner cover 11 which surrounds the screw shaft 4a, and further attenuated by and absorbed in the sound absorbing member Q attached to the whole inner surface of the inner cover 11.

Further, although some amount of noisy sound is also generated from the linear guide bearings 5b of the linear guiding unit 5, this noisy sound is intercepted by the side covers 12a, and further attenuated by and absorbed in the sound absorbing member Q on the inner surfaces of the side covers 12a. The noisy sound generated by the ball screw nut 4b threadably engaged with the screw shaft 4a and the linear guide bearings 5b of the linear guide unit 5 is intercepted by the upper cover 12b and absorbed in the sound absorbing member Q on the inner surface of the upper cover 12b.

Moreover, since the opening upper ends of the side covers 12a are not flushed with the opening side ends of the upper cover 12b, and further each of these opening ends is inwardly bent, a cavity resonance inside the locating table apparatus 100 becomes in the non-resonance mode. Therefore the noisy sound due to the resonance phenomenon is restrained.

Figure 4:
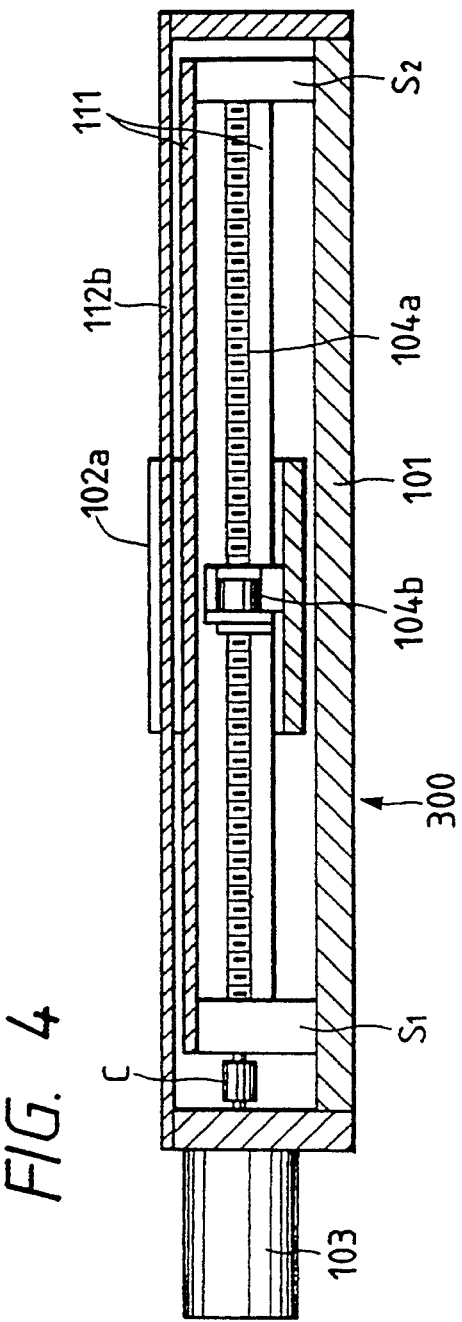
FIG. 4 is a vertical sectional view of a locating table apparatus constructed according to a second embodiment of the present invention.
Figure 5:
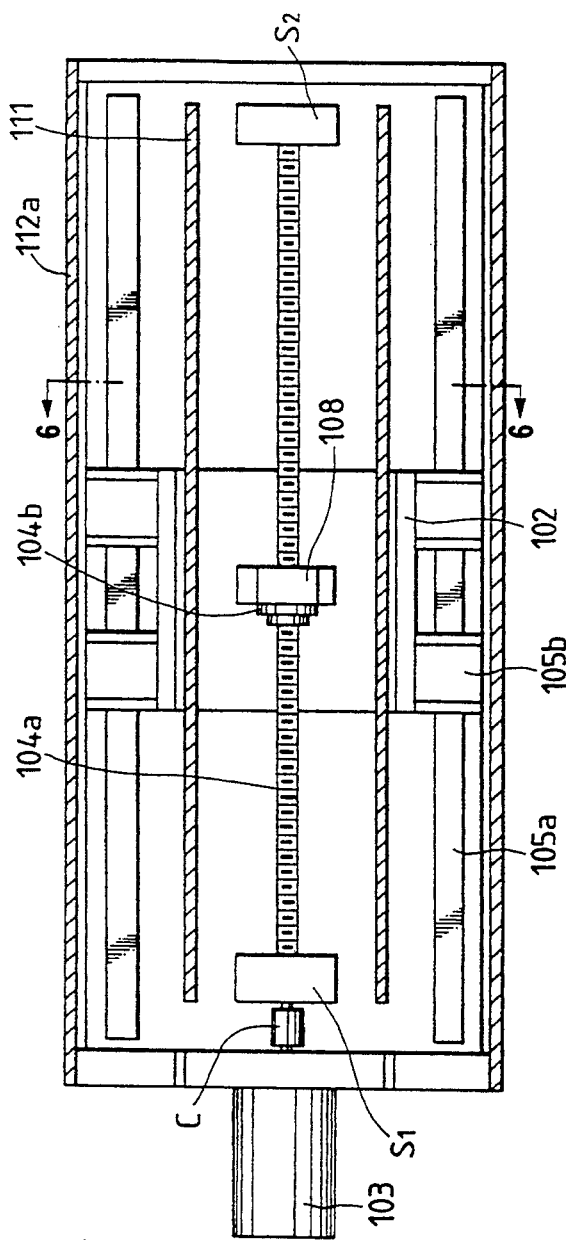
FIG. 5 is an exploded plan view of the locating table apparatus constructed according to the second embodiment of the present invention.
Figure 7:
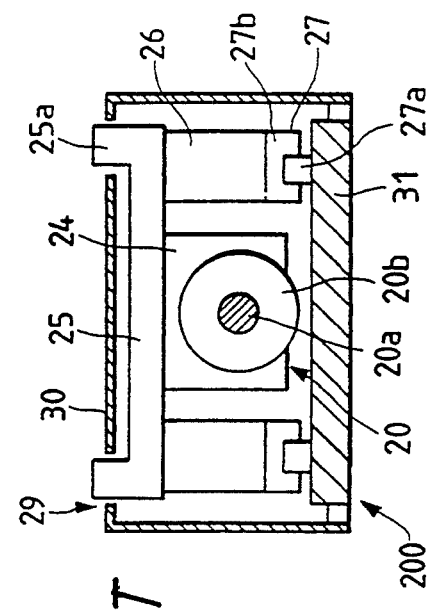
FIG. 7 is a cross-sectional view of a conventional locating table apparatus.

Next, a locating table apparatus 300 constructed according to a second embodiment of the present invention will be described with reference to FIGS. 4 to 6 as follows.

As shown in these drawings, the locating table apparatus 300 provides above 101, a table 102 of which both sides are mounted on bearings 105b fitted onto guide rails 105a extending in parallel with each other in a longitudinal direction of a base stand 101. The table 102 can be linearly moved in the axial direction in the same manner as the first embodiment. In the second embodiment, the central part of the table 102 is located below a screw shaft 104a of the ball screw unit and engaged to a ball screw nut 104b via a bracket 108. Accordingly, the positional relationship between the table and the screw shaft as seen in the vertical direction is reverse to that in the first embodiment.

An inner cover 111 is formed with a groove member having an inverted U-shaped sectional contour. As is best shown in FIG. 6, the screw shaft 104a of the ball screw unit is located at the central position of the inner cover 111, and a whole of the screw shaft 104a is surrounded with the inverted U-shaped groove member of the inner cover 111. The screw shaft 104a is operatively linked to a motor 103 via a coupling C so as to be rotationally driven by the motor 103.

A housing of the locating table apparatus 300 is covered with side soundproof covers 112a and an upper soundproof cover 112b of an outer cover 112. With this construction, the noisy sound generated by the screw shaft 104a is twice intercepted by the inner cover 111 and the upper cover 112b. Therefore, the noisy sound is remarkably attenuated.

Further, projections 102a upwardly extending from the upper surface of the table 102 are provided in the same manner as the first embodiment such that another member (e.g., a operating table) is mounted thereon.

In the second embodiment, a glass wool having excellent sound absorbing characteristics is attached to the inner cover 111 and the outer cover 112.

Figure 6:
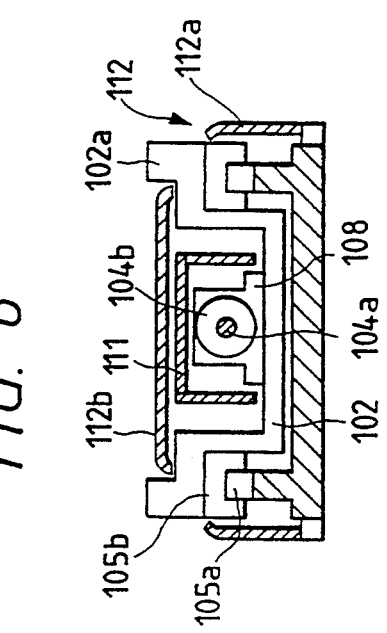
FIG. 6 is a cross-sectional view of the locating table apparatus taken along line 6—6 in FIG. 5.

Moreover, a shown in FIG. 6, both the opening side ends of the upper cover 112b can be downwardly inclined (the upper surface of the table 102 is downwardly bent at both the ends thereof corresponding to the downward inclination of the upper cover 112b), and the opening upper ends of the side covers 112a can be inwardly bent in the same manner as shown in FIG. 3. With this construction, since both the opening side ends of the upper cover 112b are not flushed with the opening upper ends of the side covers 112, the noisy sound generated inside the locating table apparatus 300 can be attenuated much more.

As is apparent from the above description, according to the present invention, the screw shaft for driving the table is covered with the inner cover having the U-shaped sectional contour, while the table is covered with the outer cover having the slits extending in the axial direction of the screw shaft. Further, a sound absorbing member is attached to at least one of the inner and outer covers. Therefore, the noisy sound generated inside the locating table apparatus can twice be attenuated by and absorbed in the sound absorbing member with simple structure. As a result, the present invention achieves an advantageous effect that the noisy sound generated inside the locating table apparatus can sufficiently be reduced with the sound absorbing member.

What is claimed is:

1. A locating table apparatus comprising:
   a base member;
   a table mounted so as to freely move in a longitudinal direction of said base member;
   driving means located on said base member for supporting and driving said table;
   an outer cover covering said table;
   an inner cover formed with a U-shaped groove member for covering said driving means therein; and
   a sound absorbing member attached to at least one of said inner and outer cover for absorbing a noisy sound.

2. The locating table apparatus of claim 1, wherein said sound absorbing member comprises a corrugated unevenness made of a spongy material.

3. The locating table apparatus of claim 2, wherein said driving means comprises a motor, a bracket member, a ball screw member linked to said motor and having a screw shaft, and a ball screw nut movably fitted to said screw shaft of said ball screw member in a direction along said screw shaft, and a lower surface of said table is engaged with said ball screw nut via said bracket member at a central part thereof.

4. The locating table apparatus of claim 3, wherein said driving means further comprises a spacer member and a linear guiding unit including a linear guide rail and a linear guide bearing fitted onto said linear guide rail, and said lower surface of said table is supported by said linear guide bearings via said spacer members at both ends thereof.

5. The locating table apparatus of claim 4, wherein said table is placed above said screw shift and comprises an upper projection upwardly projected on each end of an upper surface of said table.

6. The locating table apparatus of claim 5, wherein said inner cover surrounds said screw shaft, and said sound absorbing member is attached to an inner surface of said inner cover.

7. The locating table apparatus of claim 5, wherein said outer cover comprises an upper cover over said table so that said upper projection of said table is upwardly projected above said upper cover, and said sound absorbing member is attached to an inner surface of said upper cover.

8. The locating table apparatus of claim 7, wherein said outer cover comprises a side cover uprightly disposed on said base member, and said sound absorbing member is attached to an inner surface of said side cover.

9. The locating table apparatus of claim 8, wherein an opening end of each of said upper and side covers is inwardly bent so that a height of said opening end of said upper cover is lower than that of said side cover.

10. The locating table apparatus of claim 9, wherein said upper surface of said table is downwardly inclined at both the ends thereof corresponding to an inward bend of said upper cover.

11. The locating table apparatus of claim 1, wherein said sound absorbing member is made of a glass wool.

12. The locating table apparatus of claim 11, wherein said driving means comprises a motor, a bracket member, a ball screw member linked to said motor and having a screw shaft, and a ball screw nut movably fitted to said screw shaft of said ball screw member in a direction along said screw shaft, and a lower surface of said table is engaged with said ball screw nut via said bracket member at a central part thereof.

13. The locating table apparatus of claim 12, wherein said driving means further comprises a linear guiding unit including a linear guide rail and a linear guide bearing fitted onto said linear guide rail, and said lower surface of said table is supported by said linear guide bearings at both ends thereof.

14. The locating table apparatus of claim 13, wherein said table comprises a central part: and placed below said screw shaft, and comprises an upper projection upwardly projected over said screw shaft on each end of an upper surface of said table.

15. The locating table apparatus of claim 14, wherein said inner cover surrounds said screw shaft, and said sound absorbing member is attached to an inner surface of said inner cover.

16. The locating table apparatus of claim 14, wherein said outer cover comprises an upper cover over said table so that said upper projection of said table is upwardly projected above said upper cover, and said sound absorbing member is attached to an inner surface of said upper cover.

17. The locating table apparatus of claim 16, wherein said outer cover comprises a side cover uprightly disposed on said base member, and said sound absorbing member is attached to an inner surface of said side cover.

18. The locating table apparatus of claim 17, wherein an opening end of each of said upper and side covers is inwardly bent so that said opening end of said upper cover is not flushed with that of the side cover.

19. The locating table apparatus of claim 18, wherein said upper surface of said table is downwardly inclined at both the ends thereof corresponding to an inward bend of said upper cover.

* * * * *